(12) United States Patent  
Jernigan

(10) Patent No.: US 12,522,994 B1
(45) Date of Patent: Jan. 13, 2026

(54) FLOOD BARRIER FOR HOMES

(71) Applicant: Glen Jernigan, Dunedin, FL (US)

(72) Inventor: Glen Jernigan, Dunedin, FL (US)

( * ) Notice: Subject to any disclaimer, the term of this patent is extended or adjusted under 35 U.S.C. 154(b) by 97 days.

(21) Appl. No.: 18/422,522

(22) Filed: Jan. 25, 2024

(51) Int. Cl.
*E02B 3/10* (2006.01)
*E04H 9/14* (2006.01)

(52) U.S. Cl.
CPC .............. *E02B 3/102* (2013.01); *E04H 9/145* (2013.01)

(58) Field of Classification Search
CPC .......... E02B 3/102; E02B 3/104; E04H 9/145
See application file for complete search history.

(56) References Cited

U.S. PATENT DOCUMENTS

| | | | | |
|---|---|---|---|---|
| 4,375,929 A * | 3/1983 | Clark | ...................... | E04H 9/145 405/114 |
| 5,460,462 A * | 10/1995 | Regan | ...................... | E06B 9/00 405/87 |
| 5,725,326 A * | 3/1998 | Van den Noort | ....... | E02B 3/104 405/96 |
| 6,338,594 B1 * | 1/2002 | Adler | ...................... | E02D 5/182 |
| 6,514,011 B2 * | 2/2003 | Nomura | ................... | F15B 15/16 405/102 |
| 6,884,002 B1 * | 4/2005 | Fuller | ...................... | E02B 7/22 52/282.1 |
| 7,364,385 B1 | 4/2008 | Luke | | |
| 8,500,365 B1 * | 8/2013 | Vecherin | ................. | E04H 9/145 405/110 |
| 8,757,630 B2 * | 6/2014 | Gai | ...................... | F15B 15/1461 277/345 |
| 10,287,740 B2 | 5/2019 | Knezevich et al. | | |
| 11,035,141 B1 * | 6/2021 | Shorten | ...................... | E06B 9/02 |
| 11,255,100 B1 * | 2/2022 | Hughes | ................... | E02B 3/102 |
| 11,401,678 B1 * | 8/2022 | Schwartz | ................. | E04H 9/14 |
| 2002/0083651 A1 * | 7/2002 | Nomura | ................... | E02B 3/102 52/64 |
| 2008/0247825 A1 * | 10/2008 | Bonds | ..................... | E02B 3/102 405/107 |
| 2009/0169302 A1 * | 7/2009 | Alpern | ..................... | E02B 3/104 405/33 |
| 2011/0110722 A1 * | 5/2011 | van den Noort | ....... | E02B 3/104 405/87 |
| 2015/0117952 A1 * | 4/2015 | Gujer | ........................ | E02B 7/36 405/96 |
| 2015/0204040 A1 * | 7/2015 | Knezevich | ................ | E02B 7/54 405/114 |
| 2016/0201281 A1 * | 7/2016 | Roy | ......................... | E02B 3/104 405/107 |
| 2016/0369469 A1 * | 12/2016 | Kelly | ....................... | E02B 7/205 |
| 2017/0138038 A1 * | 5/2017 | Cueto | ....................... | E04C 3/005 |
| 2019/0153686 A1 * | 5/2019 | Adler | ...................... | E02B 3/102 |

(Continued)

*Primary Examiner* — Benjamin F Fiorello

(74) *Attorney, Agent, or Firm* — Sanchelima & Associates, P.A.; Jesus Sanchelima; Christian Sanchelima

(57) ABSTRACT

A flood barrier for homes includes a plurality of panels and an actuation assembly. The plurality of panels are interconnected one to each other. The panels are secured via a plurality of bracing members. The plurality of panels are inserted into slots disposed on a perimeter around a house to protect the house from water damage caused by a storm. Each of the plurality of panels having water-tight gaskets disposed along a bottom and mating edges of each of the panels. The actuation assembly includes actuators to automatically displace the plurality of panels.

14 Claims, 4 Drawing Sheets

(56) References Cited

U.S. PATENT DOCUMENTS

| | | | |
|---|---|---|---|
| 2019/0177940 A1* | 6/2019 | Van den Noort | E02B 3/062 |
| 2019/0211521 A1* | 7/2019 | Waters, Jr. | E02B 3/102 |
| 2020/0063389 A1* | 2/2020 | Stewart | E02B 3/104 |
| 2021/0363772 A1* | 11/2021 | Kamei | E04H 9/145 |
| 2023/0160165 A1* | 5/2023 | Waters, Jr. | E02B 3/16 |
| | | | 405/114 |

* cited by examiner

FLOOD BARRIER FOR HOMES

BACKGROUND OF THE INVENTION

1. Field of the Invention

The present invention relates to flood barriers and, more particularly, to flood barriers for home that comprise a plurality of interconnected barrier panels disposed around a building to prevent the building from being damaged by water.

2. Description of the Related Art

Several designs for flood barriers have been designed in the past. None of them, however, include flood barriers for home having a plurality of barrier panels removably secured in slots disposed around a house.

Applicant believes that a related reference corresponds to U.S. Pat. No. 10,287,740 issued for a flood barrier system that is comprised of a plurality of vertical elements which support a plurality of panel members. Applicant believes that another related reference corresponds to U.S. Pat. No. 7,364,385 issued for a protective flood barrier that includes a plurality of plastic panels that are held in position with a plurality of column members. None of these references, however, teach of flood barriers for homes that is comprised of a plurality of interconnected panels with water-tight gaskets disposed along the bottom and edges, the panels being configured to be inserted into slots formed in the ground surface around a structure.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide flood barriers for home that prevent water from getting into a house and causing water damage to the house.

It is another object of this invention to provide flood barriers for home that can be removably disposed into slots around a house when there is a threat of storm.

It is still another object of the present invention to provide flood barriers for home that includes a sump pump to further prevent the water from getting into the house.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
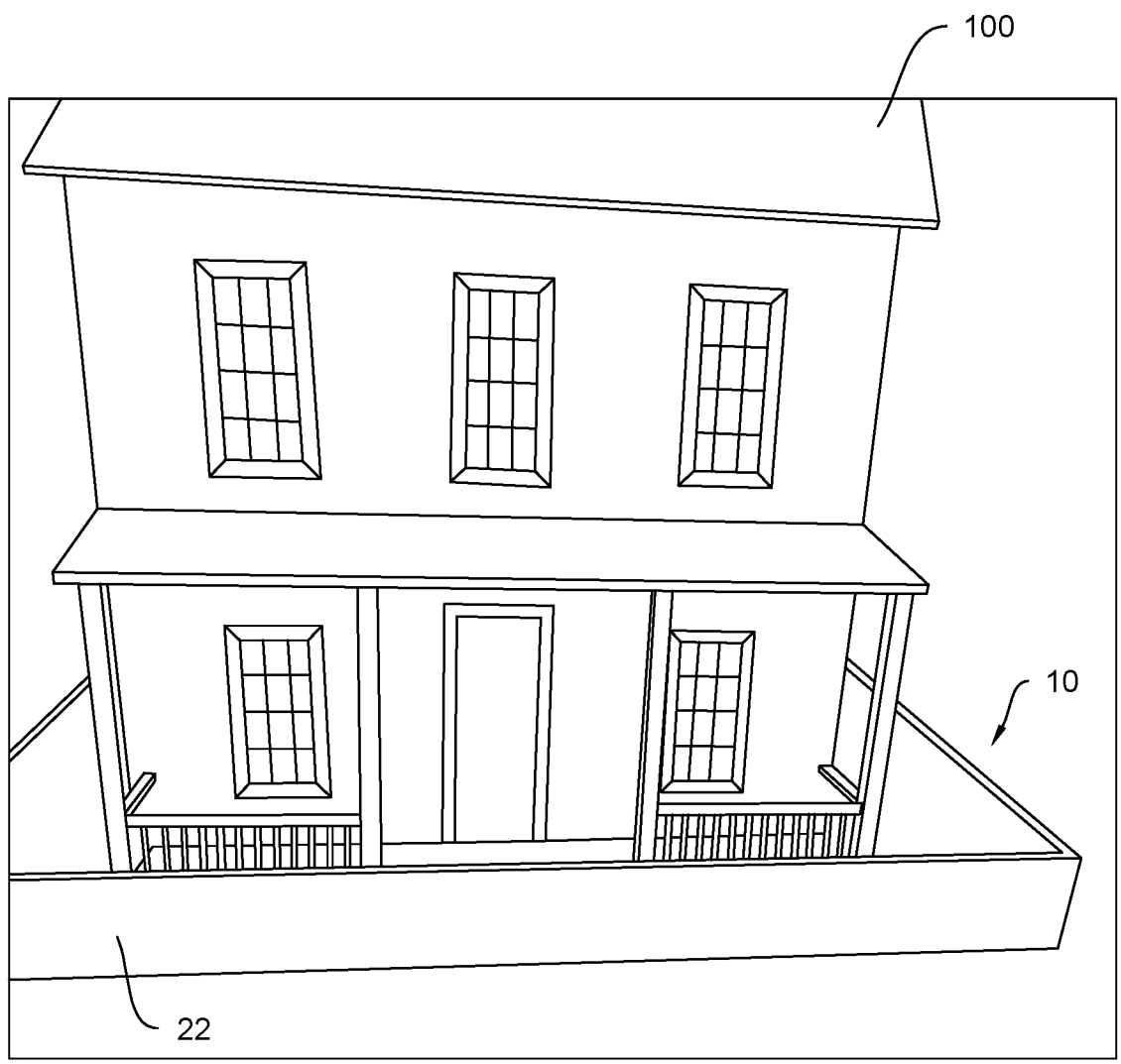
FIG. 1 represents an operational view of the present invention 10 showing the panels 22 protecting a house 100 from water damage.
Figure 2:
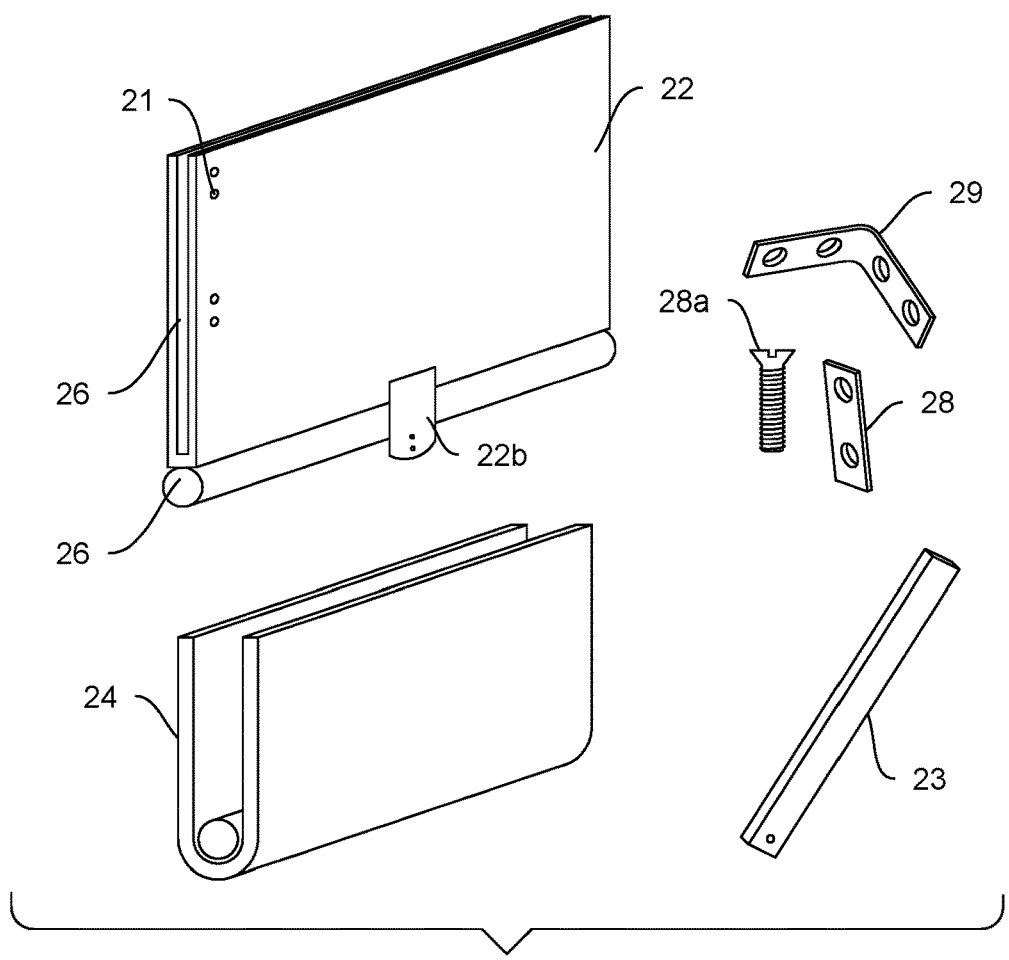
FIG. 2 shows an exploded view of the panel assembly showing the panel 22, the receiving slot 24, the gasket 26 the flat brakers 28, and corner brakers 29.

Referring now to the drawings, where the present invention is generally referred to with numeral 10, it can be observed that it basically includes a barrier assembly 20, a sump pump assembly 40, an actuation assembly 60 and a house 100. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The barrier assembly 20 may include a plurality of panels 22. Each panel of the plurality of panels 22 may have a bottom portion, a top portion, and side edges. Preferably, the bottom portion of each panel of the plurality of panels 22 may be flat and straight. In alternative embodiments, the general structure of the bottom portion of each panel may vary to accommodate the geometry of a receiving slot. The side edges of each panel of the plurality of panels 22 may be flat, straight, and perpendicular to the bottom portion of each panel of the plurality of panels 22. In alternative embodiments, the side edges of each panel may feature additional elements, such as tabs, sockets, or the like, to enable modular connection between panels.

In the present embodiment, the top portion of each panel of the plurality of panels 22 may have a flat shape or any other shape. The top portion of each panel of the plurality of panels 22 may be parallel to the bottom portion of the plurality of panels, thereby defining each panel of the plurality of panels 22 having a rectangular shape. It should be understood that the plurality of panels 22 may have other suitable shapes that allow cooperative engagement and seal the plurality of panels 22 one to each other. In a preferred embodiment, the plurality of panels 22 may be made of heavy-duty plastic. Other embodiments of the plurality of panels 22 may be made of other materials, such as water-resistant composites or other materials with good strength and covered with a water-resistant coating to prevent water of getting through the plurality of panels 22.

Each panel of the plurality of panels 22 may have holes 21 located on side portions of the plurality of panels 22. In one embodiment, the holes 21 may be threaded holes having a depth less than the width of the plurality of panels 22. In other embodiments, the holes 21 may cross an entire width of the plurality of panels 22.

The barrier assembly 20 may further include gaskets 26. Preferably, gaskets 26 may be water-tight gaskets 26 or any other suitable gasket capable of sealing two mating side edges of the plurality of panels 22. The gaskets 26 may be made of a plastic or any other suitable material. The gaskets 26 may be disposed along an entire length of each of the side edges of the plurality of panels 22.

It also may be suitable to have the first edge of each panel of the plurality of panels 22 having a channel along an entire length. The second edge of each panel of the plurality of panels 22 may have one gasket 26 disposed thereon along an entire length. The channel of a first panel of the plurality of panels 22 may receive the gasket 26 of a second panel of the plurality of panels 22 to seal the two panels of the plurality of panels 22. The gaskets 26 may also be disposed along the entire bottom portion of each panel of the plurality of panels of panels 22. Each panel of the plurality of panels 22 may include a flap 22b located on the bottom of each of the plurality of panels. The flap 22b may have a hole therein to receive fasteners.

The barrier assembly 20 may also include a receiving slot 24. In one embodiment, the receiving slot 24 may have parallel walls and a rounded bottom defining a cavity between the walls to receive a bottom portion of the plurality of panels 22. There may be a tight interference between the bottom portion of the plurality of panels 22 relative to the receiving slot 24, so that the panels can be tightly inserted thereto.

The receiving slot 24 may have the gaskets 26 disposed along an entire length of the receiving slot 24 to seal the space between the receiving slot 24 and the plurality of panels 22. The receiving slot 24 may be made of metal and have a water-resistant coating. It also may be suitable to have the receiving slot being made of concrete of other suitable materials. The receiving slot 24 may be disposed in the ground surface around an entire perimeter of a house 100. The slot 24 may be buried below the ground surface having an opening of the top portion of the slot 24 being even with the ground surface. The plurality of panels 22 may be removably inserted and secured into the receiving slot 24 when a heavy rain or storm is forecasted to protect the house 100 from water damage.

Figure 3:
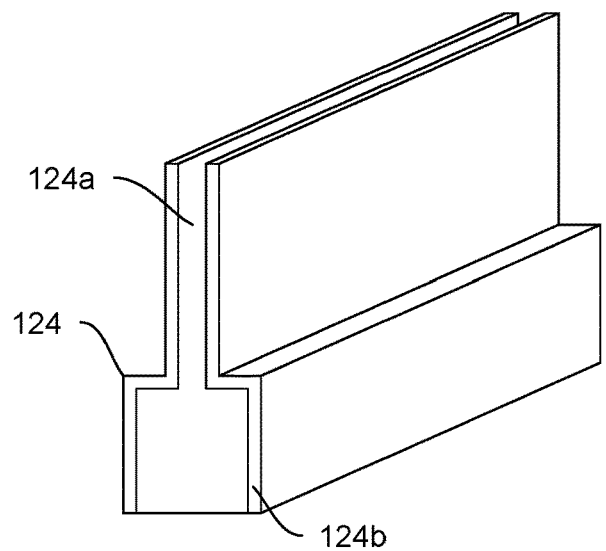
FIG. 3 is an isometric view of an alternative embodiment of the housing slot 124 with a top slot 124a and a bottom housing 124b.

Another embodiment of the barrier assembly 20 may include an alternative slot housing 124. The slot housing 124 may have a top slot 124a and a bottom housing 124b. The top slot 124a may include two parallel walls having a same size and being in front to each other as observed in FIG. 3. The walls of the top slot 124a may have a rectangular shape. The two walls of the top slot 124a may be separated a predetermined distance having an open top portion and an open bottom portion. The open bottom portion of the top slot 124a is in communication with an interior hollow portion of the bottom housing 124b. The bottom housing 124b may have a rectangular prism shape. The slot housing 124 may be installed on a ground portion around a perimeter of the house 100. The slot housing 124 may be buried below the ground surface having an opening of the top slot 124a being even with the ground surface.

The actuation assembly 60 may include actuators 62. In one of the preferred embodiments, the actuators 62 may be a waterproof linear actuator driven by an electric motor such as the PA-10 Waterproof Linear Actuator (IP68M/IP69K). It should be understood that it also may be suitable to have the actuator 62 being a pneumatic actuator, hydraulic actuator, or any other actuator capable of producing a linear force to move an object.

Each of the actuators 62 may have an actuator rod 62a having a fastener 62b located at a distal end thereof. The actuator rod 62a may be linearly extended and contracted driven by the actuator 62. Each of the actuators 62 may be enclosed by a housing 64 to provide additional protection against water damage. The housing 64 may be made of polyvinyl chloride or any other suitable waterproof durable material known in the art. Each actuator 62 enclosed by the housing 62 may be installed inside the bottom housing 124b with the rod actuator being extendable along a height of the top slot 124a.

Figure 5:
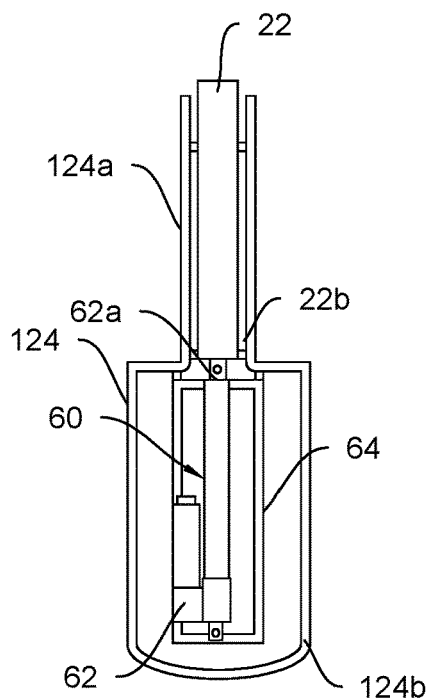
FIG. 5 shows a see-through view of the actuator assembly 60 showing the actuator 62 engaged to one panel of the plurality of panels 22 in one configuration.
Figure 6:
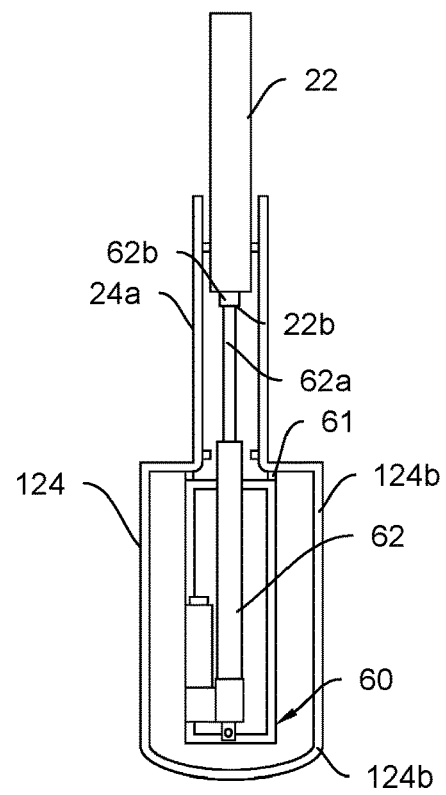
FIG. 6 is a see-through view of the actuator assembly 60 in an extended configuration.

Each panel of the plurality of panels 22 may be inserted into the top slot 124a. The fastener 62b may be secured to the flap 22b to engage each of the plurality of barriers 22 with one of the actuators 62. The actuator assembly 60 may further include sealing members 61 located inside the slot housing 124 to seal the gaps between the plurality of panels 22 and the top slot 124a. Sealing members 61 may also be disposed to seal the gaps between the housing 64 and the bottom housing 124b. The sealing members 61 may prevent water from going inside the bottom housing 124b and inside the housing 64, thus providing additional protection to the actuators 62 against water. The actuators 62 may linearly displace each of the plurality of panels 22 as observed in FIG. 5 and FIG. 6 where the actuator 62 is in a full retracted configuration and in a full extended configuration respectively.

The actuators 62 may be electrically connected to the grid. The actuators 62 may also be connected to a battery 62 for power backup in the event of grid power failures caused by a storm. In preferred embodiments, the battery 62 may be a PS-20-12-67 model or a PS-20-24-67 model. It should be understood that other embodiments of the present invention 10 may include other suitable batteries capable of providing the electrical power required by the actuators 62.

Figure 7:
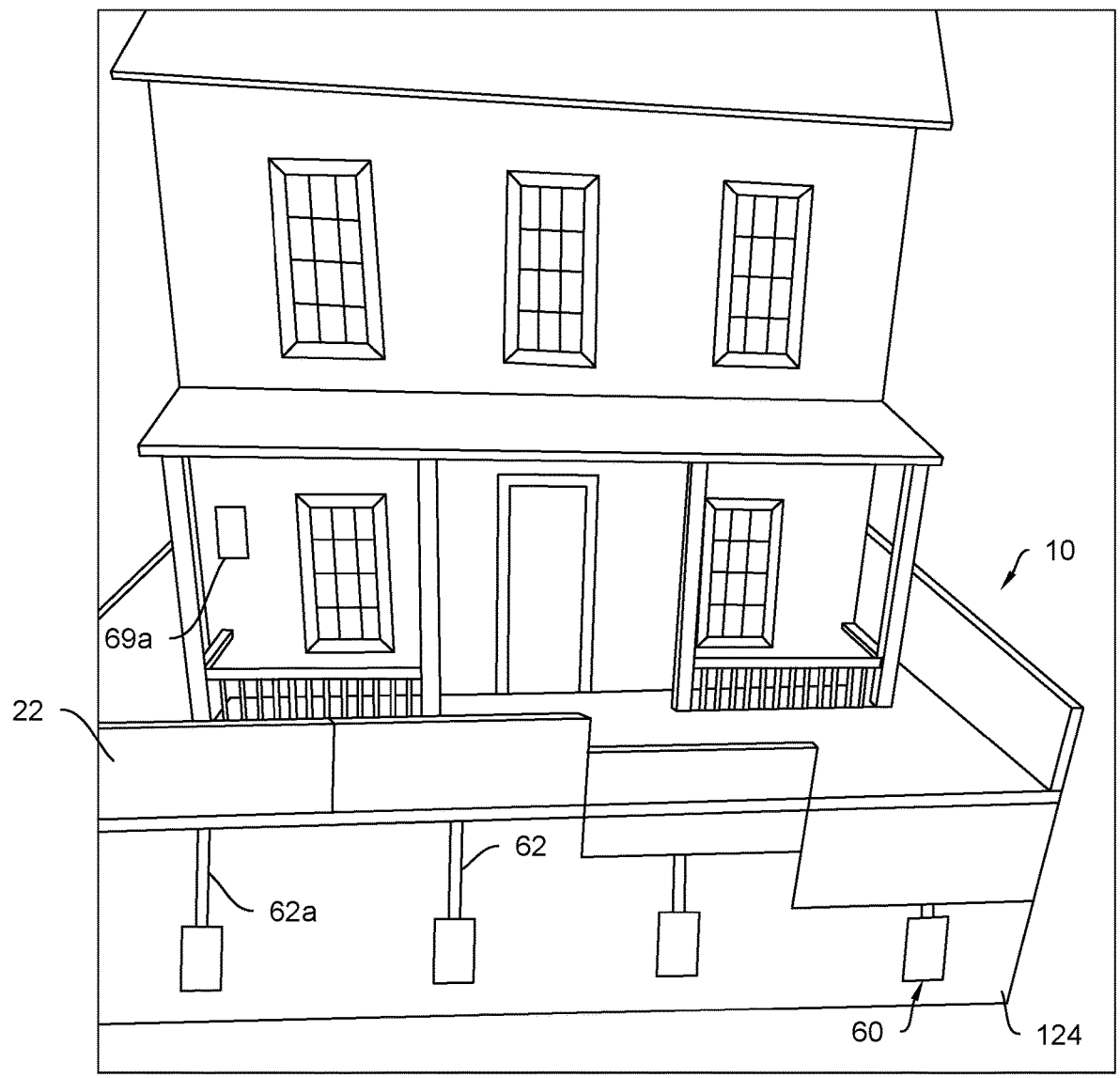
FIG. 7 shows a see-through view of the present invention 10 depicting the plurality of panels 22 being fully deployed, partially deployed and fully retracted.

The actuator assembly 60 may further include a control panel 69a to control individually the displacement of each panel of the plurality of panels 22. In FIG. 7 it can be observed the plurality of panels 22 being individually displaced by actuators 62. The control panel 69a may include a logic computer, buttons or a touchscreen input, and a power electronics stage. The control panel 69a may be any suitable control board known in the art capable of controlling the deployment of the actuators 62. It also may be suitable to have sensors connected to the control panel 69a to automatically drive the actuators 62 to extend the plurality of panels 22 when rain is detected. It also may be suitable to wirelessly control the deployment of the plurality of panels from an app in a suitable electronic device such as but not limited to smartphones, Personal Computers, or smartwatches.

Figure 4:
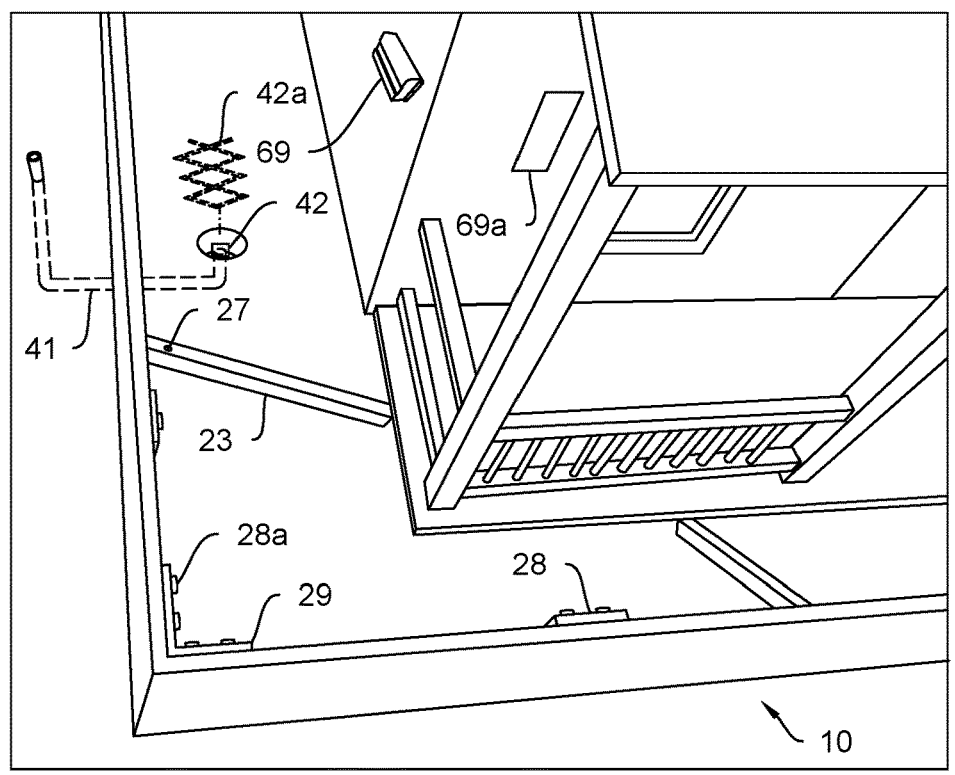
FIG. 4 illustrates an isometric view of one embodiment of the barrier assembly 20 showing the support beams 23 attached to the plurality of panels 22.

The barrier assembly 20 may also include flat bracing members 28 and square bracing members 29. In one embodiment, the flat bracing members 28 and the square bracing members 29 may be made of plastic. It also may be suitable to have the flat bracing members 28 and the square bracing members 29 made of a metal or other suitable material known in the art with good strength. The flat gracing members 28 and the square bracing members 29 may have a coating to avoid corrosion. As it can be noted in FIG. 4, the flat bracing members 28 may allow to secure two panels of the plurality of panels 22 one to each other. The square bracing members 29 may allow to fasten and secure two panels of the plurality of panels 22 to form corners around the house 100. The flat bracing members 28 and square bracing members 29 may secure the plurality of panels 22 using bolts 28a. It should be understood that other means of fastening may be used to secure the plurality of panels 22 one to each other.

Additional support to the plurality of panels 22 may be provided using support beams 23. The support beams 23 may be elongated beams having a rectangular shape with a distal end having an angle. As observed in FIG. 4, a first portion of the support beams 23 may be fastened to a base of the house 100 and a second portion of the support beams may be fastened to the plurality of panels 22 providing additional support to hold water out of the perimeter of the house 100 delimited by the plurality of panels 22. The support beams 23 may be secured to the plurality of panels 22 using support bolts 27. It should be understood that other means of fastening may be implemented to secure the support beams to the plurality of panels 22 and to the house 100.

The sump pump assembly 40 basically includes a sump pump 42 and a pipe 41. The sump pump 42 may be any suitable sump pump known in the prior art. In one embodiment the sump pump 42 may be installed in a basin buried in the ground surface of the house 100. The sump pump 42 may be located in the space between the house 100 and the perimeter delimited by the plurality of panels 22. The pump 42 may be partially covered by a grid 42a that allows for the collecting of water inside the basin. In one of the preferred embodiments, the pipe 41 may be installed below the plurality of panels 22 with an outlet of the house protruding from a portion of the ground out of the perimeter delimited by the plurality of panels 22 as observed in FIG. 4. The sump pump 42 may remove the accumulated water inside the basin. The sump pump 42 may expel the water trough the pipe 41 out of the perimeter delimited by the plurality of panels 22.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:
1. Flood barriers for home, comprising:
   a) a house; and
   b) a barrier assembly having a plurality of panels being interconnected one to each other, the plurality of panels having water-tight gaskets disposed along a bottom of each of the plurality of panels, the plurality of panels being received by a slot disposed around the house, wherein said plurality of panels are secured with a plurality of plastic bracing members; said slot having parallel walls and a rounded bottom for tight interference fit with the bottom of each of the plurality of panels, said bottom of each of the plurality of panels including a flap with a hole for receiving fasteners, said plurality of panels each having a first edge with a channel along an entire length and a second edge with one of said water-tight gaskets disposed thereon along an entire length, the channel of a first panel of the plurality of panels receiving the gasket of a second panel of the plurality of panels to seal the two panels of the plurality of panels.

2. The flood barriers for home set forth in claim 1, wherein each panel of the plurality of panels has a rectangular shape.

3. The flood barriers for home set forth in claim 1, wherein said bracing members include flat bracing members to connect a first panel of the plurality of panels with a second panel of the plurality of panels; said flat bracing members being plates with bolts.

4. The flood barriers for home set forth in claim 1, wherein said barrier assembly bracing members include square bracing members to connect a first panel of the plurality of panels with a second panel of the plurality of panels forming a corner of panels around the house; said square bracing members being L-shaped for 90-degree corners.

5. The flood barriers for home set forth in claim 1, wherein said plurality of panels are made of plastic.

6. The flood barriers for home set forth in claim 1, further including a sump pump assembly having a sump pump and a hose, said sump pump installed in a basin buried in the ground surface of the house with a grid covering the sump pump to collect water inside the basin.

7. The flood barriers for home set forth in claim 6, wherein said sump pump is installed in a space between the house and a perimeter delimited by the plurality of panels inserted into the slot.

8. The flood barriers for home set forth in claim 7, wherein said hose is disposed below the plurality of panels.

9. The flood barriers for home set forth in claim 1, further including support beams connected to the plurality of panels and to the house, said support beams being elongated rectangular beams with an angled distal end, a first portion fastened to a base of the house and a second portion fastened to the plurality of panels.

10. The flood barriers for home set forth in claim 1, further includes an actuator assembly including a plurality of linear actuators with an actuator rod being mechanically connected to each panel of the plurality of panels to automatically extend and/or retract each panel of said plurality of panels, said actuator rod having a distal fastener securing to the flap on the bottom of each of the plurality of panels.

11. The flood barriers for home set forth in claim 10, wherein the slot is a house slot having a top slot and a bottom housing, said top slot has two walls being parallel one to each other, said bottom housing being in communication with said top slot, said bottom housing receives the linear actuator therein, said bottom housing being a rectangular prism.

12. The flood barriers for home set forth in claim 10, wherein the actuator assembly further includes a battery to power the plurality of actuators.

13. Flood barriers for home, comprising:
   a) a house;
   b) a barrier assembly having a house slot and a plurality of panels, the plurality of panels being interconnected one to each other, the plurality of panels having water-tight gaskets disposed along a bottom of each of the plurality of panels, the house slot has a top slot and a bottom housing, said top slot has two walls being parallel one to each other, said bottom housing being in communication with said top slot, said house slot disposed in a perimeter around the house, said top slot receives the plurality of panels, said plurality of panels are secured one to each other using plastic bracing members, said bottom of each of the plurality of panels including a flap with a hole for receiving fasteners, said plurality of panels each having a first edge with a channel along an entire length and a second edge with one of said water-tight gaskets disposed thereon along an entire length, the channel of a first panel of the plurality of panels receiving the gasket of a second panel of the plurality of panels to seal the two panels of the plurality of panels; and c) an actuation assembly including a plurality of linear actuators with an actuator rod being mechanically connected to each panel of the plurality of panels to automatically extend and/or retract each panel of said plurality of panels, said actuator rod having a distal fastener securing to the flap on the bottom of each of the plurality of panels, said bottom housing being a rectangular prism.

14. Flood barriers for home, consisting of:
a) a house;
b) a barrier assembly having a house slot and a plurality of panels, the plurality of panels being interconnected one to each other, the plurality of panels having water-tight gaskets disposed along a bottom of each of the plurality of panels, the house slot has a top slot and a bottom housing, said top slot has two walls being parallel one to each other, said bottom housing being in communication with said top slot, said house slot disposed in a perimeter around the house, said top slot receives the plurality of panels, said plurality of panels are secured one to each other using plastic bracing members, said plurality of panels are mechanically supported by support beams attached to the plurality of panels and to the house, said bottom of each of the plurality of panels including a flap with a hole for receiving fasteners, said plurality of panels each having a first edge with a channel along an entire length and a second edge with one of said water-tight gaskets disposed thereon along an entire length, the channel of a first panel of the plurality of panels receiving the gasket of a second panel of the plurality of panels to seal the two panels of the plurality of panels, said support beams being elongated rectangular beams with an angled distal end, a first portion fastened to a base of the house and a second portion fastened to the plurality of panels, said bottom housing being a rectangular prism; and
c) an actuation assembly including a battery and a plurality of linear actuators with an actuator rod being mechanically connected to each panel of the plurality of panels, said actuator is an electric waterproof linear actuator, said battery is electrically connected to each linear actuator to automatically drive a displacement of each panel of said plurality of panels, said actuator rod having a distal fastener securing to the flap on the bottom of each of the plurality of panels.

* * * * *